United States Patent
Kim

(10) Patent No.: US 8,860,846 B2
(45) Date of Patent: Oct. 14, 2014

(54) IMAGE RECORDING/REPRODUCING DEVICE AND METHOD TO PROCESS FADE EFFECT IN IMAGE RECORDING/REPRODUCING DEVICE

(75) Inventor: Young Min Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 688 days.

(21) Appl. No.: 12/424,649

(22) Filed: Apr. 16, 2009

(65) Prior Publication Data

US 2009/0268049 A1    Oct. 29, 2009

(30) Foreign Application Priority Data

Apr. 23, 2008  (KR) .................. 10-2008-0037595

(51) Int. Cl.
  *H04N 5/262*  (2006.01)
  *H04N 5/235*  (2006.01)
  *G11B 27/038*  (2006.01)
  *H04N 9/79*  (2006.01)

(52) U.S. Cl.
  CPC ............ *H04N 9/7921* (2013.01); *G11B 27/038* (2013.01)
  USPC ....................................... 348/239; 348/229.1

(58) Field of Classification Search
  USPC ........... 348/239, 251, 222.1, 220.1, 255, 235, 348/229.1, 228.1
  See application file for complete search history.

(56) References Cited

U.S. PATENT DOCUMENTS 7,463,684 B2 * 12/2008 Srinivasan et al. ........ 375/240.12
7,495,700 B2 *  2/2009 Watanabe ..................... 348/239
7,626,617 B2 * 12/2009 Terada .......................... 348/239
2005/0174489 A1   8/2005 Yokoyama et al.
2005/0219372 A1 * 10/2005 Watanabe ................ 348/207.99
2007/0036216 A1   2/2007 Koto et al.
2007/0053657 A1   3/2007 Hamada
2007/0195098 A1 *  8/2007 Hirose et al. .................. 345/473

FOREIGN PATENT DOCUMENTS

CN       1681295      10/2005
KR      100159596      8/1998

OTHER PUBLICATIONS

International Search Report issued Aug. 25, 2009 in International Application No. PCT/KR2009/001126.
Chinese Office Action Issued on Jul. 20, 2012 in CN Patent Application No. 200980114035.5.
Sony Easy HandyCam DCR-SR90E/SR100E dated Dec. 31, 2006. Sony Corporation http://sony.net.

* cited by examiner

*Primary Examiner* — Ahmed A Berhan
(74) *Attorney, Agent, or Firm* — Stanzione & Kim, LLP

(57) ABSTRACT

An image recording/reproducing device to change a start point of a fade effect to represent a boundary between image files in a device to record/reproduce an image file so as to easily distinguish an image file displayed on a screen. A method to process a fade effect in the image recording/reproducing device includes filming a moving image, encoding the filmed moving image, and applying the fade effect when the moving image is encoded and recording a moving image file. In the moving image file, a second section to which the fade effect is applied is located after a first section to which the fade effect is not applied. Accordingly, distinguishing the moving image file with the fade effect in a reproduction mode, a preview mode of a window explorer and an image editing application without changing an algorithm is possible.

12 Claims, 5 Drawing Sheets

IMAGE RECORDING/REPRODUCING DEVICE AND METHOD TO PROCESS FADE EFFECT IN IMAGE RECORDING/REPRODUCING DEVICE

CROSS-REFERENCE TO RELATED APPLICATIONS

This application claims priority under 35 U.S.C. §119(a) from Korean Patent Application No. 2008-0037595, filed on Apr. 23, 2008 in the Korean Intellectual Property Office, the disclosure of which is incorporated herein in its entirety by reference.

BACKGROUND OF THE INVENTION

1. Field of the Invention

The present general inventive concept relates to an image recording/reproducing device to change a start point of a fade effect so as to distinguish an image file, and a method to process a fade effect in the image recording/reproducing device.

2. Description of the Related Art

If an image is unexpectedly displayed or disappears on a screen when a moving image file is reproduced by an image recording/reproducing device, a viewing effect is reduced and an unpleasant feeling is given to a viewer. In order to solve these problems, conventionally, a fade effect is applied to a boundary between image files such that a reproduction screen is smoothly changed.

A device for applying a fade effect to an image displayed on a screen is disclosed in Korean Unexamined Patent Application Publication No. 1997-012568.

In the device for applying the fade effect disclosed in the above-mentioned publication, when a reproduction function of video information recorded on a video compact disc is started or a reproduction stop function is set in a video compact disc player to record/reproduce video information, a brightness data signal applying state of the video information is adjusted so as to control the video information to gradually fade in or out on a screen such that the viewing effect is improved.

However, in the conventional device for applying the fade effect, the fade effect is applied to a first point of a moving image, that is, a start point (first frame) of an input image. Thus, the image of the first frame is the darkest and the images of a second frame and subsequent frames thereof gradually brighten such that the brightness is returned to an original brightness of a recording start point. If the fade effect is applied to the first frame, since the image of the first frame is first displayed in a reproduction mode, a preview mode of a window explorer and an image editing application, the darkest image of the first frame is displayed. Accordingly, a user cannot check which moving image is recorded in a file which is currently being displayed.

SUMMARY OF THE INVENTION

The present general inventive concept provides an image recording/reproducing device to change a start point of a fade effect to represent a boundary between image files in a device to record/reproduce an image file so as to easily distinguish an image file displayed on a screen, and a method to process a fade effect in the image recording/reproducing device.

Additional aspects and/or advantages of the present general inventive concept will be set forth in part in the description which follows and, in part, will be obvious from the description, or may be learned by practice of the general inventive concept.

The foregoing and/or other aspects and utilities of the general inventive concept may be achieved by providing a method to process a fade effect in an image recording/reproducing device, the method including filming a moving image, encoding the filmed moving image, and applying the fade effect when the moving image is encoded and recording a moving image file such that in the moving image file, a second section to which the fade effect is applied is located after a first section to which the fade effect is not applied.

A brightness of a frame located at the first section may be brighter than that of other frames located at the second section.

A brightness of a frame located at the first section may be set to original brightness of an encoding time point.

The frame located at the first section may include a first frame of the moving image file.

A brightness of the frames located at the second section may be set to be gradually increased by the fade effect.

The frames located at the second section may include a plurality of frames including a second frame of the moving image file.

The frames located at the second section may include respective frames after the first frame of the moving image file.

The method may further include displaying the recorded moving image file such that the displaying the image of the frame of the first section which is encoded with the original brightness.

The foregoing and/or other aspects and utilities of the general inventive concept may also be achieved by providing an image recording/reproducing device including a video codec to encode a filmed moving image, a fade processing unit to apply a fade effect to the encoded moving image, and a controller to control an operation to record a moving image file to which the fade effect is applied and to reproduce the recorded moving image file, wherein, in the moving image file, a second section to which the fade effect is applied is located at a first section to which the fade effect is not applied.

The controller may set a frame located at the first section to an original brightness of an encoding time point.

The controller may control the moving image to be encoded in a state in which a brightness of frames located at the second section is set to be gradually increased by the fade effect.

The image recording/reproducing device may further include a displaying unit to display the recorded moving image file, wherein the controller controls the displaying unit to display the image of the first frame of the first section is encoded with the original brightness.

The foregoing and/or other aspects and utilities of the general inventive concept may also be achieved by providing a recording medium having embodied thereon a computer program to execute a method, the method including filming a moving image, encoding the filmed moving image, and recording a file such that a second section to which the fade effect is applied when the moving image is encoded is located after a first section to which the fade effect is not applied.

The foregoing and/or other aspects and utilities of the general inventive concept may also be achieved by providing an image recording/reproducing device including a fade processing unit to apply a fade effect to a moving image, and a controller to control the fade processing unit to change a start point of the fade effect to represent a boundary between image files.

The moving image may be located in a first frame displayed with an original brightness.

The start point of the fade effect representing the boundary between the image files may be changed to a second frame.

The foregoing and/or other aspects and utilities of the general inventive concept may also be achieved by providing a method to process a fade effect in an image recording/reproducing device, the method including applying a fade effect to a moving image by a fade processing unit, and controlling the fade processing unit to change a start point of the fade effect to represent a boundary between image files.

According to an image recording/reproducing device and a method to process a fade effect in the image recording/reproducing device of the present general inventive concept, since a start point of the fade effect representing a boundary between image files in a device to record/reproduce an image file is changed to a second frame, a first frame is displayed with original brightness. Accordingly, distinguishing the displayed file image with the fade effect in a reproduction mode, a preview mode of a window explorer and an image editing application without changing a display algorithm is possible.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
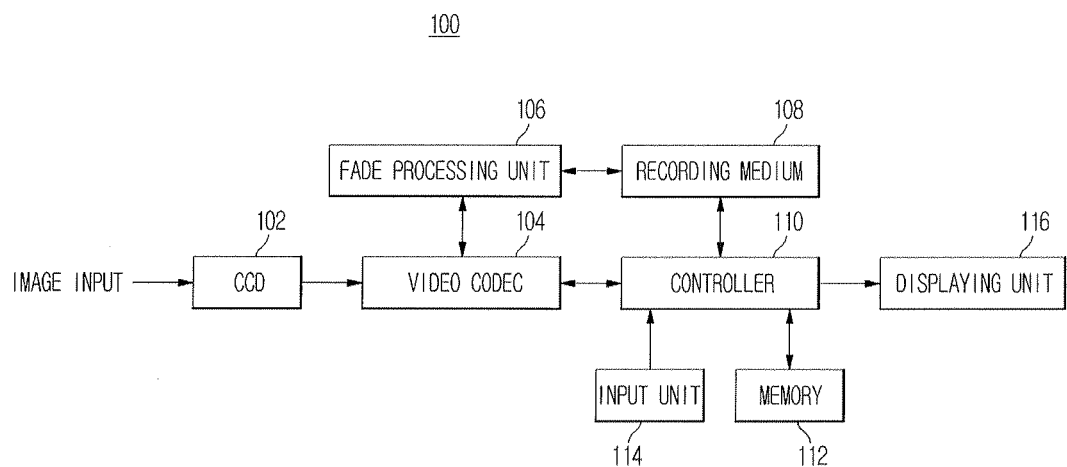
FIG. 1 is a block diagram illustrating an image recording/reproducing device according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a block diagram illustrating an image recording/reproducing device according to an embodiment of the present general inventive concept.

In FIG. 1, the image recording/reproducing device 100 according to the embodiment of the present general inventive concept includes a camera module 102, a video codec 104, a fade processing unit 106, a recording medium 108, a controller 110, a memory 112, an input unit 114 and a display unit 116.

The camera module 102 films a moving image, which is externally input, and sends an image signal to the video codec 104, and the video codec 104 compression-encodes the image signal received from the camera module 102 in an MPEG2 format and generates an image data stream or decodes the encoded image data stream into the image signal.

When the encoding of the moving image is started by the video codec 104, the fade processing unit 106 sets a brightness of an image of a first portion of the moving image, that is, a first frame of the input image, to original brightness of a recording start point, sets the brightness of an image of a second frame to lowest brightness, and sets the brightness of images of a third frame and subsequent frames thereof to be gradually increased such that the brightness returned to the original brightness of the recording start point, thereby processing a fade effect.

The recording medium 108 includes at least one of recording discs, to record contents such as a moving image file, which is subjected to the fade processing by the fade processing unit 106, or to reproduce the recorded moving image file, such as a hard disc (HDD), a digital versatile disc (DVD), a memory card and a disc loader.

The controller 110 is a microcomputer to control an entire operation of the image recording/reproducing device. The controller processes the fade effect of the moving image, which is externally input, so as to record the processed moving image on the recording medium 108, reproduces the moving image file, which is subjected to the fade processing, from the recording medium 108, and controls the display unit 116 such that a list of moving image files is displayed on the screen in a reproduction mode, a preview mode of a window explorer and an image editing application.

The controller 110 controls the fade processing unit 106 such that the start point of the fade effect is changed when the moving image is encoded by the video codec 104.

The memory 112 temporarily stores brightness data of the frames of the moving image, which is subjected to the fading processing by the fade processing unit 106, or a variety of data which is generated when the controller 110 is operated.

The input unit 114 is a user interface to input a user command such that a desired moving image file is selected or a desired moving image file is reproduced via a graphic user interface (GUI).

The display unit 116 displays the first frame of the moving image file according to a control command of the controller 110. Although the fade effect is applied to the moving image file, the image of the first frame of the moving image file is displayed with the original brightness of the recording start point. Accordingly, the moving image file which can be distinguished is displayed on a content list screen.

Hereinafter, an operation and an effect of an image recording/reproducing device and a method to process a fade effect in the image recording/reproducing device will be described.

Figure 2:
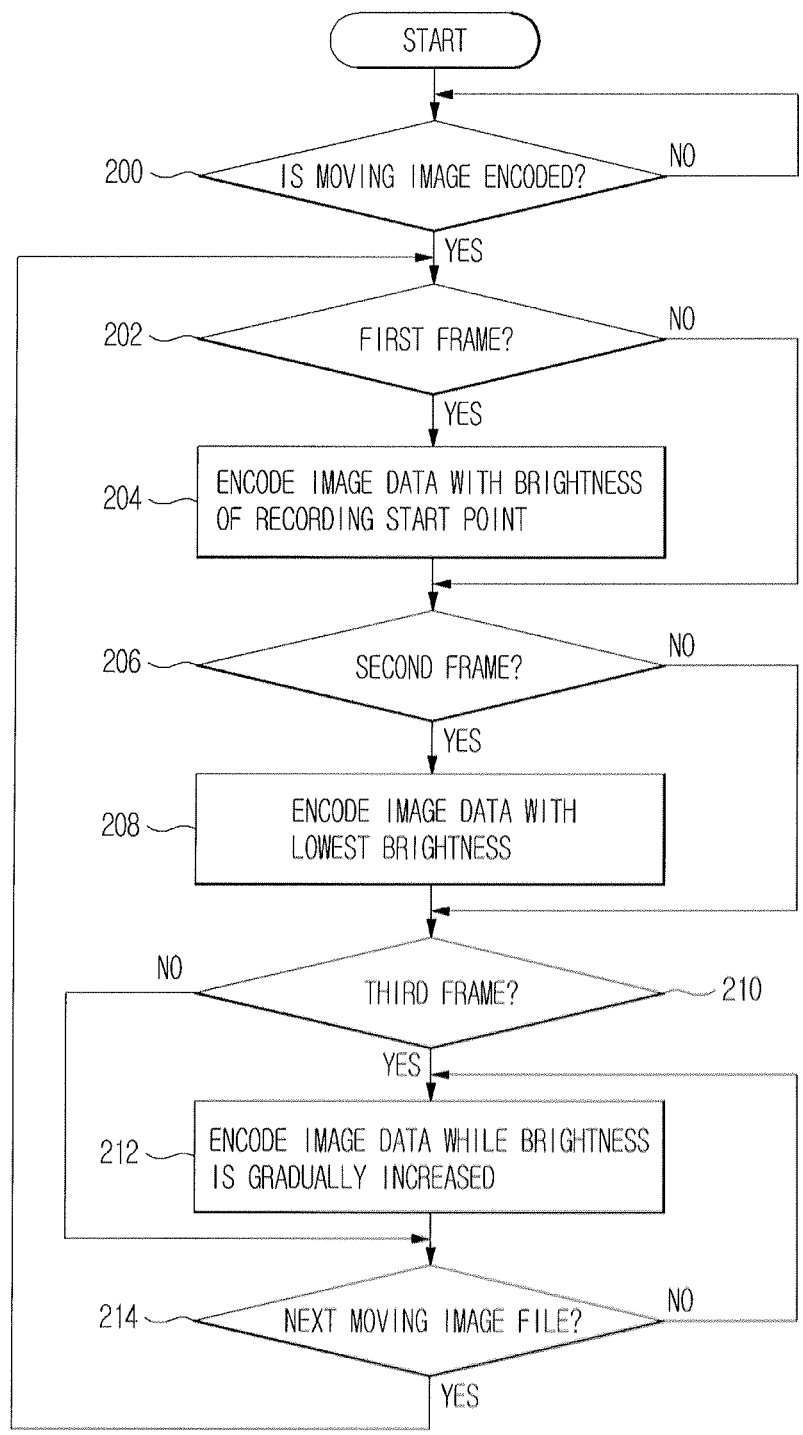
FIG. 2 is a flowchart illustrating a method to process a fade effect in an image recording/reproducing device according to an embodiment of the present general inventive concept.

FIG. 2 is a flowchart illustrating the method to process the fade effect in the image recording/reproducing device according to the embodiment of the present general inventive concept.

Referring to FIGS. 1 and 2, when a moving image which is externally input is filmed by the camera module 102 and the image signal is output, the video codec 104 receives the image signal from the camera module 102 and encodes the image signal.

The controller 110 determines whether the moving image is encoded (operation 200) and then determines whether first portion of the moving image is the first frame of the input image (202) if a determination is made that the moving image is encoded.

Figure 3:
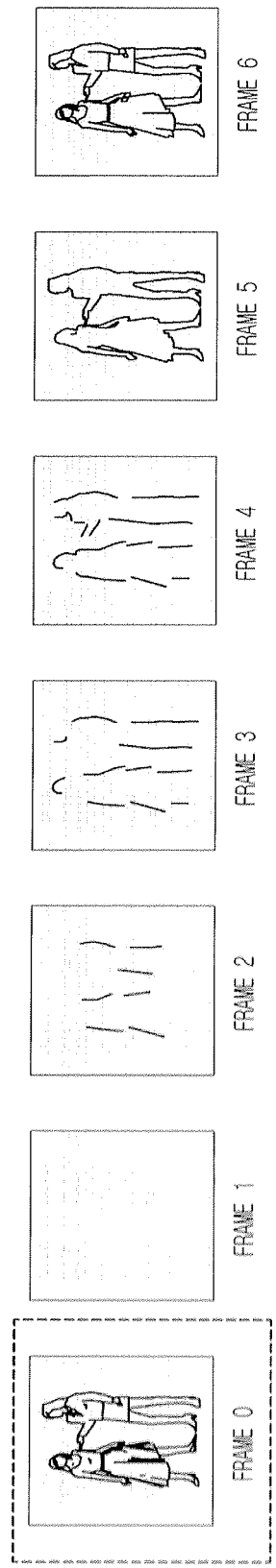
FIG. 3 is a view illustrating an example of encoding a moving image in the image recording/reproducing device according to the embodiment of the present general inventive concept.

If a determination is made that the first portion of the moving image is the first frame of the input image in Operation 202, then the controller 110 sets the brightness of the image to the original brightness of the recording start point via the fade processing unit 106 such that the image data is encoded as "frame 0" illustrated in FIG. 3 (operation 204). Since the image of the first frame of the moving image file is displayed on the screen of the display unit 116 in the reproduction mode, the preview mode of the window explorer and the image editing application, the moving image file is displayed with the original brightness such that the user can easily identify the moving image file in any mode.

Thereafter, the controller 110 determines whether the image corresponds to the second frame of the moving image (operation 206). If a determination is made that the image corresponds to the second frame, then the controller 110 sets the brightness of the image to the lowest brightness via the fade processing unit 106 such that the image data is encoded as "frame 1" illustrated in FIG. 3 (operation 208). Accordingly, the fade effect is applied to a boundary between the files when the moving image file is reproduced, such that a reproduction screen is smoothly switched.

Subsequently, the controller 110 determines whether the image corresponds to the third frame of the moving image (operation 210). If a determination is made that the image corresponds to the third frame of the moving image, then the controller 110 sets the brightness of the image to be increased via the fade processing unit 106 such that the image data is encoded as "frame 2" illustrated in FIG. 3 (operation 208). Then, a determination is made whether the image corresponds to a next moving image file (operation 214).

If a determination is made that the image does not correspond to the next moving image file in Operation 214, then the method goes back to Operation 212, and the operation to encode the image data as "frame 3", "frame 4", . . . illustrated in FIG. 3 by the fade effect to gradually increase the brightness of the image such that the brightness is returned to the original brightness is repeatedly performed.

Figure 4:
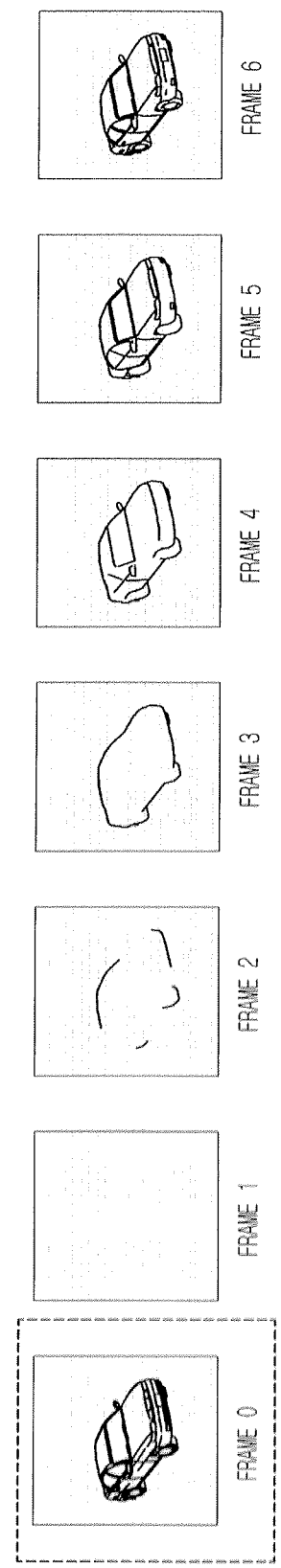
FIG. 4 is a view illustrating an example of encoding a moving image in the image recording/reproducing device according to the embodiment of the present general inventive concept.

Meanwhile, if the image corresponds to the next moving image file in Operation 214, the method goes back to Operation 202, and the operation to encode the image data of the first frame of the next moving image file with the brightness of the recording start point and encoding the image data while applying the fade effect to the second frame and the subsequent frames thereof is repeatedly performed as illustrated in FIG. 4.

Figure 5:
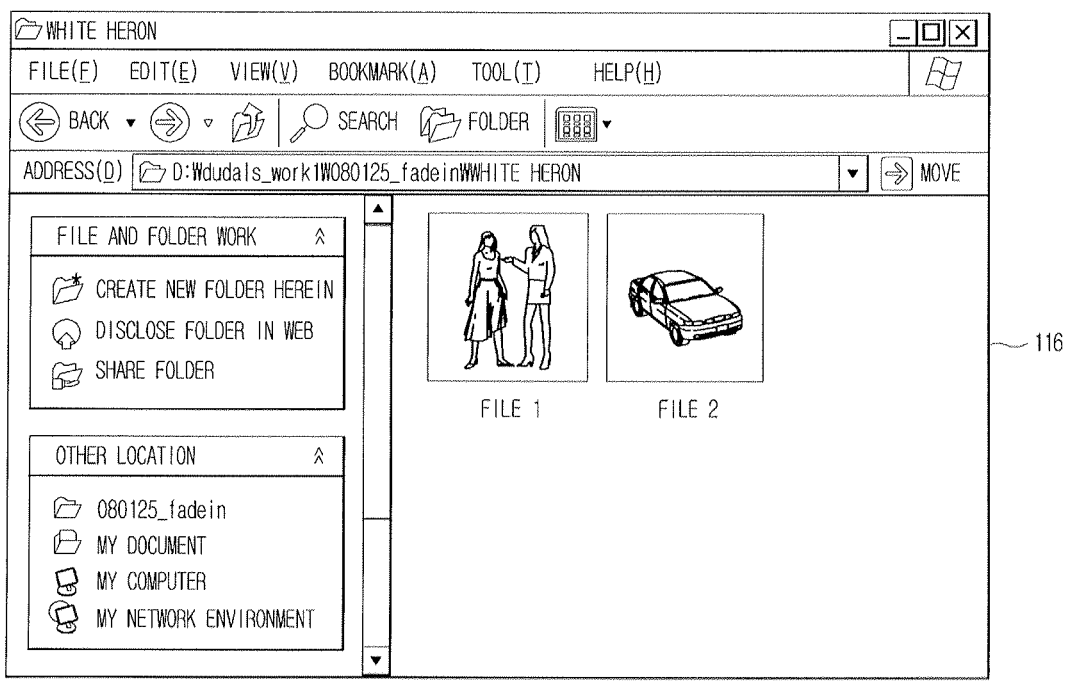
FIG. 5 is a view illustrating a moving image file displayed on a screen of a display unit of the image recording/reproducing device according to the embodiment of the present general inventive concept.

When the image data of the first frame is encoded with the brightness of the recording start point and the image data of the second frame and the subsequent frames thereof is encoded while applying the fade effect to the second frame and the subsequent frames thereof, as illustrated in FIG. 5, the image of the first frame is displayed with the original brightness although the moving image file displayed on the content list screen of the display unit 116 is the moving image file to which the fade effect is applied. Accordingly, the contents can be distinguished.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The present general inventive concept is not limited to a specific display device or application. That is, when the image of the first frame is displayed in any one of a display device, a window explorer or an image editing application, a dark image is not displayed on the screen and the image is displayed with the original brightness. Accordingly, the image file displayed on the screen can be distinguished.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A method to process a fade effect in an image recording/reproducing device, the method comprising:
   capturing a moving image;
   encoding the captured moving image; and
   applying the fade effect when the moving image is encoded and recording a moving image file,
   wherein, the fade effect is not applied to a first frame of the moving image file such that a brightness of the first frame is set to an original brightness of a recording start point, and the fade effect is applied to a second frame and at least one subsequent frames of the moving image file.

2. The method according to claim 1, wherein a brightness of the first frame is brighter than that of other frames.

3. The method according to claim 1, wherein a brightness of the second frame and the at least one subsequent frames are set to be gradually increased by the fade effect.

4. The method according to claim 1, further comprising displaying the recorded moving image file such that the displaying of the recorded moving image file includes displaying the image of the first frame which is encoded with the original brightness.

5. An image recording/reproducing device, comprising:
   a video codec to encode a captured moving image;
   a fade processing unit to apply a fade effect to the encoded moving image; and
   a controller to control an operation to record a moving image file to which the fade effect is applied and to reproduce the recorded moving image file,
   wherein, the fade effect is not applied to a first frame of the moving image file such that a brightness of the first frame is set to an original brightness of a recording start point, and the fade effect is applied to a second frame and at least one subsequent frames of the moving image file.

6. The image recording/reproducing device according to claim 5, wherein the controller controls the moving image to be encoded in a state in which a brightness of the second frame and the at least one subsequent frames is set to be gradually increased by the fade effect.

7. The image recording/reproducing device according to claim 5, further comprising:
   a displaying unit to display the recorded moving image file,
   wherein the controller controls the displaying unit to display the image of the first frame is encoded with the original brightness.

8. A non-transitory recording medium having embodied thereon a computer program to execute a method, the method comprising:
   capturing a moving image;
   encoding the captured moving image; and
   recording a file,
   wherein, a fade effect is not applied to a first frame of the moving image file such that a brightness of the first frame is set to an original brightness of a recording start point, and a fade effect is applied to a second frame and at least one subsequent frames of the moving image file when the moving image is encoded.

9. An image recording/reproducing device, comprising:
   a fade processing unit to apply a fade effect to a moving image; and
   a controller to control the fade processing unit to change a start point of the fade effect to represent a boundary between image files,
   wherein, the fade effect is not applied to a first frame of the moving image file such that a brightness of the first frame is set to an original brightness of a recording start point, and the fade effect is applied to a second frame and at least one subsequent frames of the moving image file.

10. The image recording/reproducing device of claim 9, wherein the moving image is located in a first frame displayed with an original brightness.

11. The image recording/reproducing device of claim 10, wherein the start point of the fade effect representing the boundary between the image files is changed to a second frame.

12. A method to process a fade effect in an image recording/reproducing device, the method comprising:
   applying a fade effect to a moving image by a fade processing unit; and
   controlling the fade processing unit to change a start point of the fade effect to represent a boundary between image files,
   wherein, the fade effect is not applied to a first frame of the moving image file such that a brightness of the first frame is set to an original brightness of a recording start point, and the fade effect is applied to a second frame and at least one subsequent frames of the moving image file.

* * * * *